United States Patent
Gillich et al.

(10) Patent No.: US 6,709,119 B2
(45) Date of Patent: Mar. 23, 2004

(54) RESISTANT SURFACE REFLECTOR

(75) Inventors: Volkmar Gillich, Neuhausen am Rheinfall (CH); Renato Kirin, Thayngen (CH); Roman Fuchs, Schaffhausen (CH)

(73) Assignees: Alusuisse Technology & Management Ltd., Neuhausen am Rheinfall (CH); Alanod Aluminium-Veredelung GmbH & Co., Ennepetal (DE)

( * ) Notice: Subject to any disclaimer, the term of this patent is extended or adjusted under 35 U.S.C. 154(b) by 0 days.

(21) Appl. No.: 10/231,155

(22) Filed: Aug. 30, 2002

(65) Prior Publication Data

US 2003/0048554 A1 Mar. 13, 2003

Related U.S. Application Data

(62) Division of application No. 09/830,410, filed on Apr. 27, 2001.

(51) Int. Cl.⁷ .............................. G02B 5/08; G02B 1/10
(52) U.S. Cl. .................. 359/883; 359/884; 359/584
(58) Field of Search ................. 359/584, 585, 359/586, 588, 589, 883, 884

(56) References Cited

U.S. PATENT DOCUMENTS

| | | | | |
|---|---|---|---|---|
| 3,363,998 A | * | 1/1968 | Keister et al. |
| 3,720,541 A | * | 3/1973 | King |
| 4,105,821 A | | 8/1978 | Blaich |
| 4,340,646 A | | 7/1982 | Ohno et al. |
| 4,348,463 A | | 9/1982 | Ohno et al. |
| 4,517,217 A | | 5/1985 | Hoffman |
| 4,556,599 A | * | 12/1985 | Sato et al. |
| 4,602,847 A | | 7/1986 | Born et al. |
| 4,643,518 A | | 2/1987 | Taniguchi |
| 4,830,873 A | | 5/1989 | Benz et al. |
| 4,840,442 A | * | 6/1989 | Mouchart et al. |
| 4,944,581 A | * | 7/1990 | Ichikawa |
| 5,019,458 A | * | 5/1991 | Elgat et al. |
| 5,177,396 A | * | 1/1993 | Gielen et al. |
| 5,216,551 A | * | 6/1993 | Fujii |
| 5,403,657 A | | 4/1995 | Textor et al. |
| 5,411,794 A | | 5/1995 | Kawaguchi et al. |
| 5,424,876 A | | 6/1995 | Fujii |
| 5,583,704 A | | 12/1996 | Fujii |
| 5,709,930 A | | 1/1998 | DePauw |
| 5,760,981 A | | 6/1998 | Gillich |
| 5,779,871 A | | 7/1998 | Gillich |
| 5,828,493 A | * | 10/1998 | Bischer, Jr. et al. |
| 5,856,020 A | | 1/1999 | Gillich |
| 5,978,133 A | | 11/1999 | Gillich |
| 6,078,425 A | * | 6/2000 | Wolfe et al. |
| 6,310,737 B1 | | 10/2001 | Gillich et al. |

FOREIGN PATENT DOCUMENTS

| | | |
|---|---|---|
| BE | 1007299 A3 | 5/1995 |
| EP | 0 456 488 A1 | 11/1991 |
| EP | 0495755 | 7/1992 |
| EP | 0568943 | 11/1993 |
| EP | 0610831 | 2/1994 |
| EP | 0 714 039 A1 | 5/1996 |
| EP | 0358011 | 8/1999 |

* cited by examiner

*Primary Examiner*—Ricky D. Shafer
(74) *Attorney, Agent, or Firm*—Fisher, Christen & Sabol

(57) ABSTRACT

A reflector with high total reflection which is resistant to mechanical stresses. The reflector includes a reflector body and superimposed thereon (a) a functional coating such as a varnish, (b) a reflecting layer structure composed of a reflecting metallic layer and optionally arranged thereon one or several transparent ceramic layers, for example, layers having an optical depth of $\lambda/2$. The reflecting layer structure contains, as its surface layer, a protective layer. The protective layer is a silicon oxide of general formula $SiO_x$, wherein x is a number from 1.1 to 2.0, or it is aluminum oxide of formula $Al_2O_3$, in a thickness of 3 nm or more. The protective layer protects the underlying layers from mechanical damages. In the DIN 58196 abrasion test the protected surface does not show any damages after 50 test cycles with 100 abrasion strokes.

3 Claims, 1 Drawing Sheet

RESISTANT SURFACE REFLECTOR

This is a division of U.S. application Ser. No. 09/830, 410, filed on Apr. 27, 2001, that is a 371 national stage application of PCT/CH98/00489, filed on Nov. 12, 1998.

BACKGROUND OF THE INVENTION

1. Field of the Invention

The present invention relates to a reflector which is resistant to mechanical attack and with high total reflectance, comprising a reflector body and arranged thereon:
  a) a functional coating; and
  b) a sequence of reflective layers containing one reflective layer and several transparent layers.

The invention also relates to the use of such reflectors.

2. Background

Manufacture of strips of bright materials, e.g. highest grade aluminum or aluminum based AlMg alloys with purity percentage of 99.8% and higher, e.g., 99.9%, and rolled surfaces that produce diffuse or directed light reflection, depending on the application, are generally well-known. For the purpose of increasing directed reflection (degree of brilliance), chemical or electrolytic burnishing followed by anodic oxidation of the surface of strips of this kind, in order to produce a protective layer, e.g. 1.5 μm thick, is also well-known.

The known methods have the further disadvantage that expensive, high grade aluminum based bright alloys with a high degree of purity have to be used. The degree of surface reflectance is reduced by the anodic oxide layer and consequently so are total reflectance and directed reflectance due to absorption and diffuse light scatter, especially in the oxide layer. This results in loss of energy.

EP-A 0 495 755 discloses objects with aluminum surfaces which are suitable for deposition of layer systems on these surfaces from the vapour phase. Anodizing of the surfaces is not carried out and a layer system is described consisting, for example, of an adhesive layer such as a ceramic layer, a light reflecting layer, a metal layer, e.g. aluminum, and one or more transparent protective layers of e.g. oxides, nitrides or fluorides of magnesium, titanium or praseodymium. Such layer systems exhibit a high degree of reflection. A system of this type nevertheless has the disadvantage that the surface is very sensitive to mechanical influence.

EP-A 0 568 943 describes deposition of a reflective layer on an aluminum base layer and a superimposed gel film which has been deposited on the aluminum by a sol-gel process. Reflection is obtained by a layer system comprising silicon dioxide, metal, silicon dioxide and titanium dioxide layers. This is also a possible way of obtaining reflective aluminum materials. The layer structure described in EP-A 0 568 943 is not resistant to mechanical stress to the desired extent.

BROAD DESCRIPTION OF THE INVENTION

The purpose of the present invention is to avoid the disadvantages described and to propose reflectors in which the reflecting layer is insensitive to external mechanical influences and which is characterized by high stability against wiping.

According to the invention this is achieved by the sequence of reflective layers containing as the protective layer a silicon dioxide having the general formula $SiO_x$, where x is a number from 1.1 to 2.0, or an aluminum oxide having the formula $Al_2O_3$, in a thickness of 3 nm (nanometers) or more, with the protective layer as the surface layer protecting the subjacent layers against mechanical damage and the protective layer shows no surface damage in the wiping test according to DIN 58196 after 50 test cycles of 100 wipe strokes each.

DETAILED DESCRIPTION OF THE DRAWING

Figure 1:
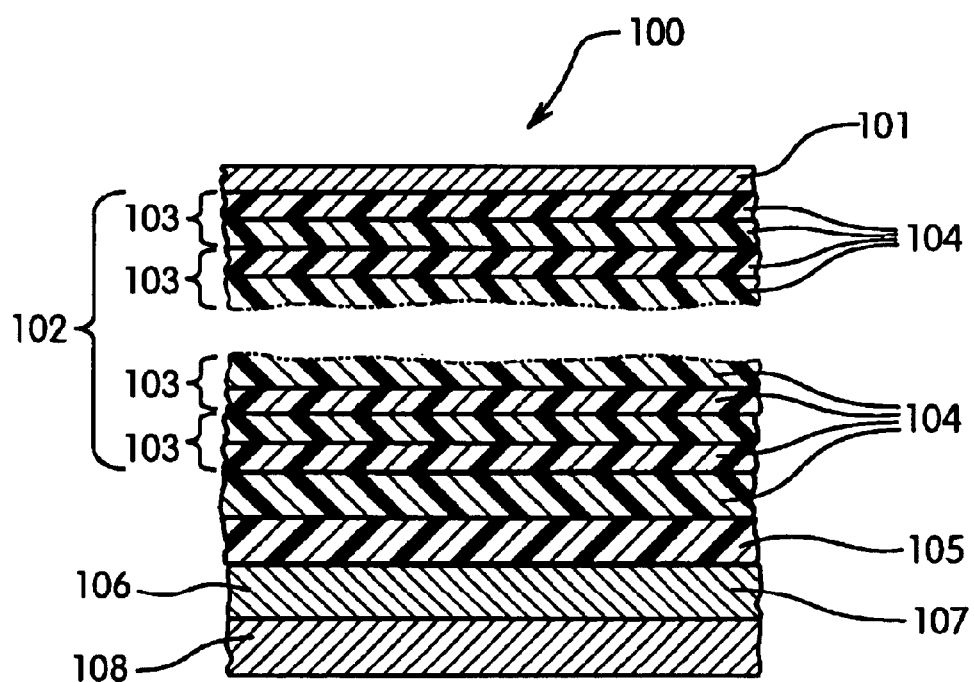
FIG. 1 is a cross-sectional view of an embodiment of the invention.

In FIG. 1:
100 is the reflector of the invention;
101 is the protective layer;
102 is the reflector sequence of layers;
103 is one of the ten transparent layers;
104 is one of the transparent sheets;
105 is the reflective layer;
106 is the functional layer;
107 is the anodized layer, and
108 is the reflector body.

DETAILED DESCRIPTION OF THE INVENTION

Similarly, in the present invention the protective layer is considered as one of the transparent layers in the sequence of reflective layers.

In a suitable embodiment the minimum thickness of the protective layer is 3 nm. The maximum thickness of the protective layer may, for example, be 1000 nm and advantageously 400 nm. In another embodiment the thickness of the protective layer may preferably be 40 nm or less. The thickness of the protective layer may in particular be 3 to 20 nm. In the present description of the invention, the term nm means nanometer.

In further embodiments the thickness of the protective layer can also be defined by its optical thickness. The optical thickness should preferably comply with the formula: $n \cdot d = \lambda/2 + 40$ nm. The optical thickness may also be a multiple of the same, expressed as k, in which k is a natural number, such as 2, 3, 4, 5, 6, 7, 8, 9 or 10. In these formulae, n is the index of refraction and d the geometrical thickness. $\lambda$ corresponds to the intensity maximum of the wavelength of the reflected electromagnetic radiation. In visible light, $\lambda$ is in the region of 550 nm.

All spatial formations having at least one uncovered surface consisting of a metal such as iron, steel, aluminum or aluminum alloy or a plastic or ceramic material or glass can be used as reflector bodies. This uncovered surface may for example consist of aluminum with a purity level of 98.3% and over, and even in some cases with a purity level of for example 99.0% and over, 99.7% and over, 99.9% and over or 99.95% and over. Besides aluminum of the said purity level, the surface may also be an alloy. Preferred alloys are those having grades AA 1000, AA 3000 and AA 5000. Other preferred alloys contain for example 0.25 to 5 w. %, particularly 0.5 to 4 w. % magnesium, or contain 0.2 to 2 w. % manganese or 0.5 to 5 w. % magnesium and 0.2 to 2 w. % manganese, in particular for example 1 w. % magnesium and 0.5 w. % manganese, or containing 0.1 to 12 w. %, preferably 0.1 to 5 w. % copper or containing 0.5 to 6 w. % zinc and 0.5 to 5 w. % magnesium or containing 0.5 to 6 w. % zinc, 0.5 to 5 w. % magnesium and 0.5 to 5 w. % copper or containing 0.5 to 2 w. % iron and 0.2 to 2 w. % manganese, in particular for example 1.5 w. % iron and 0.4 w. % manganese or AlMgSi alloys or AlFeSi alloys. Further examples are AlMgCu alloys such as Al99.85Mg0.8Cu or AlMg alloys such as AlMg1.

Especially preferred uncovered surfaces are for example aluminum surfaces with a purity level of 99.5% and over, 99.8% and over, 99.85% or aluminum alloy surfaces containing 0.5 w. % magnesium or containing 1 w. % magnesium or containing aluminum with a purity level of 99% and 5 to 10, in particular 7, w. % magnesium and 6 to 12, or in particular 8, w. % copper. All rollable aluminum alloys are also especially preferred.

Examples of reflector bodies are castings and forgings and in particular rolled products such as foils, strips, plates, sheets witch can if necessary be transformed by bending, deep-drawing, cold extrusion and similar methods. In addition, profiles, bars and other forms can be used. Depending on the intended use, the complete reflector body may be made of the metal and preferably said aluminum or aluminum alloys, but also only part or surface areas may consist of these materials.

Said metal and in particular the aluminum or aluminum alloy may also be a constituent part or surface component of a composite, e.g. a foil composite or a laminate comprising any desired material, e.g. plastics and metals such as Al-coated sheet iron or steel or Al-coated plastics.

The metal and/or aluminum surfaces can for example be produced by chemical and/or mechanical alteration of the surface, e.g. rolling, forging, cold extrusion, pressing or casting followed by subsequent treatment by grinding, polishing, blasting with hard substances etc. Rolled surfaces produced by using smooth or textured rollers are preferred.

Sheet aluminum or Al-coated sheet iron or steel, for example 0.2 to 0.8 mm thick, more suitably 0.3 to 0.7 mm, and preferably 0.4 to 0.5 mm, are preferred as reflector bodies. One example is 0.5 mm thick A4 Al 99.5 aluminum sheet (purity 99.5%).

The aluminum surfaces may also be subjected to a chemical or electrochemical bright finishing or alkali pickling process. Such bright finishing or pickling processes should be applied before anodizing.

The aluminum surfaces with any topography may have a surface roughness $R_a$ of for example 0.01 to 5 $\mu$m and preferably from 0.01 to 0.5 $\mu$m. Further advantageous preferred roughnesses $R_a$ are from 0.01 to 0.4 $\mu$m and especially from 0.03 to 0.06 $\mu$m, where 0.04 $\mu$m is especially suitable. The surface roughness $R_a$ is defined in at least one of DIN specifications 4761 to 4768.

In the case of the present reflector at least one pretreatment coat may be deposited between the reflector body and the functional coating a).

In the case of a reflector body made of a metal containing mainly iron, the pretreatment coat may be a layer produced by chromatizing, phosphatizing or galvanizing. In the case of an aluminum reflector body, the pretreatment coat may be a layer generated for example by chromatizing, phosphatizing or anodic oxidation. The pretreatment coat should preferably consist of anodic-oxidated aluminum, and in particular is generated directly from the aluminum on the surface of the reflector body. The thickness of the pretreatment layer may for example be at least 10 nm, suitably 20 nm, especially suitably at least 50 nm, preferably at least 100 nm and especially preferably at least 150 nm. The maximum thickness of the pretreatment layer may for example be 1500 nm and preferably 200 nm. The thickness of the pretreatment layer should therefore preferably be from 100 nm to 200 nm.

For example the pretreatment layer may be an anodically produced oxide layer built up in a redissolvent or non-redissolvent electrolyte. The pretreatment layer may also contain a yellow chromatizing layer, a green chromatizing layer, a phosphate layer or a chromium-free pretreatment layer built up in an electrolyte containing at least one of the elements Ti, Zr, F, Mo or Mn.

The functional coating a) is deposited directly on the reflector body or—if present—on the pretreatment layer. In the case of anodic oxidation, the aluminum oxide layer formed by the anodic oxidation may form the functional layer a).

For example the thickness of the functional layer a) should be between 0.5 and 20 $\mu$m, more suitably between 1 and 20 $\mu$m, preferably between 2 and 10 $\mu$m and especially preferably between 2 and 5 $\mu$m. If the aluminum oxide coat formed by anodic oxidation constitutes the functional coating a), its thickness as indicated above is between 20 and 1500 nm.

The functional coating a) may for example be a gel film applied in a sol-gel process.

The gel film may be a coating with organofunctional silanes of a metal compound and may for example:

A) be obtained by hydrolytic condensation of the following components, if necessary in the presence of a condensing catalyst and/or conventional additives:

1. at least one cross-linkable organofunctional silane having the formula (II):

$$R'''_m SiX_{(4-m)} \qquad (II)$$

in which the X groups, which may be the same or different, signify hydrogen, halogen, alkoxy, acyloxy, alkyl carbonyl, alkoxycarbonyl or —NR''$_2$ (R''=H and/or alkyl) and the R''' residues, which may be the same or different, are alkyl, alkenyl, alkinyl, aryl, arylalkyl, alkylaryl, arylalkenyl, alkenylaryl, arylalkinyl or alkinylaryl, whereby these residues can be interrupted by O— or S-atoms or the —NR'' group and carry one or more substituents from the halogens group and from the possibly substituted amino, amide, aldehyde, keto, alkylcarbonyl, carboxy, mercapto, cyano, hydroxy, alkoxy, alkoxycarbonyl, sulphonic acid, phosphoric acid, acryloxy, methacryloxy, epoxy or vinyl groups and m has the value 1, 2 or 3, and/or one of the oligomers derived therefrom, whereby the R''' residue and/or the substituent must be a cross-linkable residue or substituent, in a quantity of from 10 to 95 mol % relative to the total number of moles of the (monomer) starting constituents.

2. at least one metal compound having the general formula III:

$$MeR_y \qquad (III)$$

in which Me is a metal, selected from the group Al, Zr, Ti, whereby y=3 in the case of aluminum and 4 in the case of Ti and Zr and in which residues R, which may be the same or different, are halogen, alkyl, alkoxy, acyloxy or hydroxy, where said groups can be fully or partially replaced by chelate ligands and/or by an oligomer derived therefrom and/or by a possibly complexated aluminum salt of an inorganic or organic acid, in a quantity of from 5 to 75 mol % relative to the total number of moles of the (monomer) starting constituents.

3. where applicable at least one non-crosslinkable organofunctional silane having the formula I:

$$R'_m SiX_{(4-m)} \qquad (I)$$

in which the X groups, which may be the same or different, are hydrogen, halogen, hydroxy, alkoxy, acyloxy, alkylcarbonyl, alkoxycarbonyl or —NR"2 (R"=H and/or alkyl) and the R' residues, which may be the same or different, are alkyl, aryl, arylalkyl or alkylaryl, whereby the residues may be interrupted by O or S atoms or the —NR" group and may carry one or more substituents from the halogens group, and if necessary substituted amide, aldehyde, keto, alkylcarbonyl, carboxy, cyano, alkoxy, alkoxycarbonyl groups, and m has the value 1, 2 or 3, and/or an oligomer derived therefrom, in a quantity from 0 to 60 mol % relative to the total number of moles of the (monomer) starting constituents, and 4. where applicable one or more low-volatile oxides, soluble in the reaction medium, of an element of the main group IA to VA or of the subgroups IIb., IIIb., Vb. to VIIIb of the periodic table, with the exception of Al, and/or one or more compounds of one of these elements, soluble in the reaction medium, forming a low-volatile oxide under the reaction conditions, in a quantity from 0 to 70 mol % relative to the total number of moles of the (monomer) starting constituents;

and

B) by addition of an organic prepolymer to this hydrolytic condensate, whereby the reacting crosslinkable groups of the R''' residue and/or of the crosslinkable substituents on the R''' residue are crosslinkable with those on the prepolymer, or advantageously analogous and by addition of a quantity of 2 to 70 mol % of the prepolymer relative to the total number of moles of the (monomer) starting constituents;

C) by depositing the resulting coating solution on a substrate, especially on the reflector body, or on the existing pretreatment coat and subsequent precipitation hardening.

Further information and details relating to the functional coatings a) in gel film form are to be found in EP-A 0 610 831 and EP-A 0 358 011.

The silanes described can be replaced by compounds containing titanium, zircon or aluminum instead of silicon. It is thereby possible to vary the hardness, density and refractive index of the functional coating. The hardness of the functional coating can also be controlled by the use of various silanes, for example, by formation of an inorganic network to control hardness and thermal stability or by the use of an organic network to control elasticity. A functional coating which can be placed between the inorganic and organic polymers is for example deposited by means of the sol gel process by targeted hydrolysis and condensation of alkoxides, mainly silicon, aluminum, titanium and zircon, on the aluminum substrates. An inorganic network is built up by this process and by way of correspondingly derived silicic acid ester, additional organic groups can be inserted which are used firstly for functionalisation and secondly for formation of defined organic polymer systems. The gel film can furthermore also be deposited by electro-dipcoating in accordance with the principle of cataphoretic deposition of an amine and organically modified ceramic.

The functional coatings a), like said silanes or lacquers, can be deposited on the reflector body either directly or by way of a pretreatment coat by immersion, brush, roller or spinning, spraying, coil-coating, etc.

After coating the anodised surface of the reflector body with the functional coating a), the coating can be hardened. Hardening can be carried out by radiation, e.g. UV radiation, electron beam radiation or laser beam radiation and/or at high temperature. The temperature can be raised by convection or heat radiation, e.g. IR and/or UV radiation, or by a combination of convection and radiation e.g. UV and/or IR radiation or by hot gas, e.g. hot air. The temperature, measured on the layer subjacent to the functional coating, e.g. the metal such as aluminum layer, is for example greater than 110° C., suitably greater than 150° C. and preferably between 150° C. and 240° C. For clear lacquers these temperatures are for example frequently around 230° to 240° C. The raised temperature can act on the body for e.g. from 10 seconds to 120 minutes. Convection heating can suitably be carried out by the action of heated gases, such as air, nitrogen, inert gases or mixtures thereof.

The functional coating a) causes a levelling or smoothing of the surface. For example $R_a$ values of less than 0.01 $\mu$m and preferably less than 0.02 $\mu$m are obtained. The surface roughness $R_a$ is defined in at least one of DIN specifications 4761 to 4768.

The functional coating a) can be a single layer, i.e. a monolayer, or a multiple layer, such as a double layer, triple layer, etc. The multiple layers, e.g. double layers or triple layers etc. can all be made of the same or different materials, each selected from amongst the materials mentioned for functional coatings a). The double coating, triple coating etc. can be produced for example by depositing a first layer, prehardening or precipitation hardening the first layer, depositing the second layer and precipitation hardening of the second layer. A first layer which has only been prehardened can be precipitation hardened at the same time as the second layer. If a third layer is deposited, the first and second layers can be precipitation hardened or prehardened and the precipitation hardening concern only the third layer, or—where still necessary—the subjacent layers can be precipitation hardened together with the third layer. The same applies accordingly for further layers, such as fourth layers etc. Prehardening comprises processes such as leaving to dry, predrying under the effect of heat or radiation, or radiation or heat treatments. The useful thickness of a double or triple layer lies within said range of 1 to 20 $\mu$m, whereby each individual layer deposited may for example have a thickness from 2 to 5 $\mu$m.

The sequence of reflective layers b) contains a reflecting layer e.g. a layer of aluminum, silver, copper, gold, chromium, nickel or alloys containing for example mainly at least one of the said metals. The thickness of the reflective layer may for example be 10 to 20 nm (nanometers). The reflective layer is generally placed on the functional coating a) either directly or by way of an adhesive layer.

The sequence of reflective layers b) furthermore contains several transparent layers. The transparent layers are deposited on the reflective layer. For example 1, 2, 3, 4, 5, 6, 7, 8, 9 or 10 transparent layers—counted without the protective layer—advantageously complies with the formula $\lambda/2$ with regard to the optical thickness of each layer, whereby in particular each of these transparent layers is a double layer comprising 2 layers of thickness $\lambda/4$. The optical thickness of each transparent layer having the formula $\lambda/2$ may vary by +40 nm. One transparent layer is preferred, or further preferably two, three or more transparent layers which can be made of the same or different materials, whereby each of the transparent layers exhibits an optical thickness of $\lambda/2+40$ nm and in particular a double layer has the thickness $2\cdot\lambda/4$. The protective layer, which is also transparent, is arranged on the said transparent layer or layers as the top layer, or as the surface layer. $\lambda$ corresponds to the intensity maximum of the wavelength of the reflected electromagnetic radiation.

The materials of the transparent layers consist of or contain, e.g., oxides, nitrides, fluorides, sulphides, etc. of alkaline metals e.g. Li, Na, K, alkaline earth metals e.g. Mg, Ca, Sr, Ba, semimetals e.g. Si, transitional metals e.g. Sc, Ti, V, Cr, Mn, Fe, Co, Ni, Y, Zr, Nb, Mo, Te, Ru, Rh, Pd, Hf, Ta, W, Re, Os, Pr, Pt, lanthanoids e.g. La, Ce, Pr, Nd, Pm, Dy, Yb, Lu etc. In particular SiOx should be mentioned, in which x has the significance of 1.1 to 2.0 and preferably 1.8, $Al_2O_3$, $MgF_2$, $TiO_2$, $B_2O_3$, Be oxide, ZnO, $SnO_2$, indium-tin oxide (ITO), CdS, CdTe and hafnium and zirconium oxides. Advantageously, at least one of the transparent layers with the exception of the protective layer has materials other than those of the protective layer itself.

One, several or all the transparent layers may have the optical thickness $\lambda/2+40$ nm. Double layers comprising two layers with an optical thickness of $\lambda/4$ advantageously comprise a low refractive layer of optical thickness $\lambda/4$ and a high refractive layer of optical thickness $\lambda/4$. The double layers particularly advantageously comprise two layers, namely a first and a second layer of optical thickness $\lambda/4$ and consisting of a low refractive first layer of optical thickness $\lambda/4$ of $SiO_2$ or $MgF_2$ and a high refractive second layer of optical thickness $\lambda/4$ of Ti-oxide or Ti,Pr-oxide having.

Accordingly, one, two or more transparent layers of optical thickness $\lambda/2$ comprising two transparent layers of optical thickness $\lambda/4$ consisting of materials with different refractive indices can be produced to strengthen the degree of reflection due to partial reflection of light in the phase boundary. The individual transparent layers of optical thickness $\lambda/4$ are typically from 30 nm, or preferably from 40 nm, to 200 nm thick. One example of a transparent layer of optical thickness $\lambda/2$ consisting of two layers of optical thickness $\lambda/4$ may contain a low refractive layer of $SiO_2$, $MgF_2$ etc. with optical thickness $\lambda/4$ and a high refractive layer of Ti-oxide, Ti/Pr-oxide, tantalum oxide etc. with optical thickness $\lambda/4$.

Also preferred are reflective layer sequences b) comprising a reflective layer, on this one or two transparent layers, each of the said transparent layers in the form of $\lambda/4$ double layers and thus having optical thickness $\lambda/2$, and a protective layer situated on the surface of the transparent layers and made of silicon dioxide having the general formula $SiO_x$, in which x is a number from 1.1 to 2.0, or an aluminum oxide, and in which the thickness of the protective layer is 3 nm or more.

Also preferred are reflective layer sequences consisting of a reflective layer, on this a transparent layer having optical thickness $\lambda/4$ with a low refractive index and a transparent layer on this having optical thickness $\lambda/4$ with a high refractive index, and a protective layer situated on the surface of silicon dioxide having the general formula $SiO_x$, in which x is a number from 1.1 to 2.0, or an aluminum oxide having a thickness of 3 nm or more. Still greater reflection can be obtained with several double layers $2\lambda/4$, with alternating lower and higher refractive indices.

The present invention accordingly comprises reflectors containing reflector bodies, where applicable on this a pretreatment layer either deposited on the reflector body or formed on the surface from the reflector body itself, the functional layer deposited thereon and the reflective layer sequence deposited on the latter. The sequence of reflective layers in turn has the reflective layer which is generally superimposed on the functional layer. In one embodiment one or more transparent layers of optical thickness $\lambda/2$ may be superimposed on the reflective layer and in turn be covered by the protective layer. The layer described as the protective layer consequently always constitutes the free layer on the outside of the reflector which is exposed to mechanical influences.

All the layers or individual layers of the reflective layer sequence b) can for example be applied by deposition in vacuum in the gas or vapour phase (physical vapor deposition PVD), or by thermal vaporization, by electron beam vaporization with and without ion support, by sputtering, in particular by magnetron sputtering, by plasma polymerization or by chemical vapor deposition (CVD) with and without plasma support, onto the reflector body or onto a pretreatment coat thereon. Other application methods are by lacquer or dipcoating in solutions produced by the sol-gel process with subsequent drying, by the flame pyrolytic method or flame coating using $SiO_2$. Two or more processes can also be combined. For example, PVD layers can be supplemented by flame coating with $SiO_2$.

The reflective layer or sequence of reflective layers can for example be deposited on the surface by a process sequence that includes—if necessary, the degreasing and cleansing stages—transfer of the object containing the surface to be coated to a vacuum system, cleaning e.g. by sputtering, glow discharge etc., in the first stage deposition of a light-reflecting and in particular a metallic layer, and in the second stage deposition of a transparent layer, and where applicable in third, fourth, etc., stages deposition of a second, third, etc. transparent layer, and removal of the coated object from the vacuum.

The reflective layer can also be produced in accordance with an electrolytic or wet chemical process. The transparent layers, and here in particular the protective layer, can be present in the form of gel films produced by a sol-gel process. The transparent layers, and here in particular the protective layer, can also be obtained by a flame pyrolytic method. It is also possible to use different processes for the individual layers of a sequence of layers.

For example, in the case of rolled products, e.g. foils, strips or sheets, or in the case of laminates containing an aluminum layer, individual coatings or preferably all coatings are applied or deposited in a continuous process, usually the belt or continuous process, also known as coil-coating. To produce the pretreatment layer, for example, processes for anodic oxidation of aluminum can be applied. The functional layer a) e.g. a sol-gel layer, can also be applied in a continuous process, in which the sol is applied to the surface to be treated by immersion, spraying, etc. or by coil-coating, and dried or hardened by subsequent radiation and/or heat treatment in a through-type furnace. Finally, the reflective layers b) can be deposited by vaporization, sputtering, etc., in both cases especially in a vacuum etc.

The reflective layer sequence b) on the reflector body is used in particular for the purpose of reflection of electromagnetic radiation or energy in the form of waves and/or particles, suitably for reflection of radiation with wavelengths within the optical range and preferably visible light, in particular with wavelengths between 400 to 750 nm.

Reflectors according to the invention with surfaces having the reflective layer sequence according to the invention, have outstanding reflectance, for example, for electromagnetic radiation and especially electromagnetic radiation in the optical range. The optical range comprises e.g. infrared, the range of visible light, ultraviolet, etc. The preferred area of application is the field of electromagnetic radiation and visible light.

Depending on the surface, reflection of radiation can be directed, scattered or a combination of these. Consequently, the reflectors according to the present invention are suitable as reflectors for e.g. radiation sources or optical equipment. Such radiation sources are e.g. lights, such as screen workstation lights, primary lights, secondary lights, grid lights, light-guide elements, illuminated ceilings, light deflector plates or heat radiators. The reflectors can for example also be mirrors or internal mirrors in optical equipment, luminaries or heat radiators.

The reflective layer sequence b) on the reflector body in particular leads to reflectors, the coated surfaces of which have total reflection, measured as a reflection value to DIN 5036, of advantageously 90% and over and especially 94% and over.

The reflectors according to the present invention have for example outstanding wiping resistance and hardness. Wiping resistance can be determined in accordance with DIN 58196. To summarize, a sample with a felt-based stamp with contact pressure of 4.5N (corresponding to approximately 450 g) is tested over a wiping distance of 120 mm with 100 strokes in 74 seconds (1.3 Hz) in accordance with the existing DIN standard 58196. The test cycle is repeated 20, 50 and 80 times and the samples are then each assessed. On a scale of 1 to 5, score 1 signifies no damage to the surface, 2 means that traces of abrasion can be detected under special viewing in the light cabinet, 3 means abrasion traces are detectable when viewed in daylight, 4 signifies that strong abrasion traces are visible over the entire surface and 5 signifies that very strong abrasion traces are visible over the entire surface.

The reflectors, e.g. in the form of foils, strips or sheets, can also be transformed with scarcely any visible cracking. The reflectors according to the invention have good protective effect against mechanical degradation such as mechanical damage, e.g. scratch resistance or abrasion, and in particular a high wiping resistance. Mechanical damage can for example occur during cleaning of surfaces, i.e. the reflective layers, due to dust, sand etc. trapped between the cleaning device and the surface of the said layers or by the cleaning device itself, e.g., a rag, wiper, brush, etc.

The present invention also includes the use of reflectors containing a surface resistance to mechanical attack with high total reflectance for reflection of radiation in the optical range, i.e. of daylight and artificial light, radiation of heat, visible light, ultraviolet light etc. Use of the reflectors is particularly important for reflection of visible light, especially daylight or artificial light, including UV light. The reflectors according to the invention are for example suitable for use as reflectors or light-guide elements in lighting and illumination technology, e.g., as reflectors in screen workstation lights, primary lights, secondary lights, grid lights, light-guide elements, illuminated ceilings or as light deflector plates, etc.

EXAMPLES

Various test samples of aluminum or aluminum alloys are partly pretreated by anodization and partly simply degreased and then coated with a lacquer. A sequence of reflective layers is deposited on the lacquer coat by means of a PVD process. The sequence of reflective layers consists successively of the aluminum reflecting layer in a thickness of 50 nm and deposited thereon firstly a silicon dioxide layer having an optical thickness of $\lambda/4$ followed by a titanium dioxide layer having an optical thickness of $\lambda/4$. In accordance with the invention, the protective layer is applied as the outermost layer by a further PVD process in the form of a layer of $SiO_2$ having a thickness from 5 to 10 nm. In each of the control samples the protective layer is not present. All samples are subjected to the wiping test in accordance with DIN 58196 and the stability against wiping of the sample is assessed. The samples in accordance with the invention are graded after every 50 test cycles comprising 100 wiping strokes. In terms of wiping resistance, the comparison samples diminish so that the number of test cycles given is that after which a low score of 3 or maximum 5 is achieved. The test arrangement and the values obtained are given in the following table.

The following table shows that the protective coat leads to a considerable improvement of stability against wiping. After termination of the test at 50 test cycles of 100 strokes each, all the test samples in accordance with the invention show a still undamaged surface with score 1. The comparison samples however clearly show a decrease of stability against wiping and after less than 10 and 20 test cycles respectively the samples are damaged in such a way that a result of score 3 or worse is obtained.

TABLE

| Sample No. | Substrate | Pretreatment | Lacquer | Sequence of Reflector | Protective coat | Wiping Test: No. of Test Cycles = score |
|---|---|---|---|---|---|---|
| 1 | Al99.7 | anodized | Sol-Gel[1] | Al/$SiO_2$/$TiO_2$ | $SiO_2$ | 50x = 1 |
| Control 1 | Al99.7 | anodized | Sol-Gel[1] | Al/$SiO_2$/$TiO_2$ | none | less than 10x |
| 2 | Al99.9 | degreased | Sol-Gel[1] | Al/$SiO_2$/$TiO_2$ | $SiO_2$ | 50x = 1 |
| Control 2 | Al99.9 | degreased | Sol-Gel[1] | Al/$SiO_2$/$TiO_2$ | none | less than 20x |
| 3 | AlMgCu | degreased | $SiO_2$/$TiO_2$ Sol/Gel Mixture | Al/$SiO_2$/$TiO_2$ | $SiO_2$ | 50x = 1 |
| Control 3 | AlMgCu | degreased | $SiO_2$/$TiO_2$ Sol/Gel Mixture | Al/$SiO_2$/$TiO_2$ | none | less than 10x |
| 4 | AlMg | degreased | Sol/Gel on polysiloxane base | Al/$SiO_2$/$TiO_2$ | $SiO_2$ | 50x = 1 |
| Control 4 | AlMg | degreased | Sol-Gel on polysiloxane base | Al/$SiO_2$/$TiO_2$ | none | less than 20x |
| 5 | Al99.7 | nm 150 $Al_2O_2$ barrier layer | Sol-Gel[1] | Al/$SiO_2$/$TiO_2$ | $SiO_2$ | 50x = 1 |

TABLE-continued

| Sample No. | Substrate | Pretreatment | Lacquer | Sequence of Reflector | Protective coat | Wiping Test: No. of Test Cycles = score |
|---|---|---|---|---|---|---|
| Control 5 | Al99.7 | nm 150 Al$_2$O$_2$ barrier layer | Sol-Gel[1)] | Al/SiO$_2$/ TiO$_2$ | none | less than 20x |

[1)]With organic constituent

What is claimed is:

1. A reflector which is resistant to mechanical attack and has high total reflectance, comprising a reflector body and arranged thereon in the following sequence:
   (a) a functional coating
   (b) a sequence of reflective layers containing (b)(1) one metallic reflective layer and (b)(2) several transparent layers, and
   (c) protective layer as surface layer, the functional coating (a) is (a)(I), a gel film applied-gel process and the gel film is a coating of at least one organofunctional silane of a metal compound, or (a)(ii), in the case of the reflector body being aluminum, an aluminum oxide layer formed by anodic oxidation of the aluminum reflector body, or (a)(iii) in the case of the reflector body being aluminum, the gel film (a)(I) and an aluminum oxide layer formed by anodic oxidation of the aluminum reflector body, the aluminum oxide layer being between the gel film (a)(I) and the aluminum reflector body, and the several transparent layers (b)(2) being 2, 3, 4, 5, 6, 7, 8, 9 or 10 transparent layers of optical thickness $\lambda/2$, the thickness of each transparent layer of optical thickness $\lambda/2$ can vary up to, and including, plus 40 nm, each transparent layer comprising two transparent sheets of optical thickness $\lambda/4$, the thickness of each transparent sheet of optical thickness $\lambda/4$ can vary up to, and including, plus 40 nm, and the protective layer is a silicon oxide having the general formula SiO$_x$, where x is a number from 1.1 to 2.0, or an aluminum oxide having the formula Al$_2$O$_3$, and has a thickness of 3 nm to 20 nm, the protective layer as the surface layer protects subjacent layers against mechanical damage, and the protective layer shows no surface damage in a wiping test according to DIN 58196 after 50 test cycles of 100 wiping strokes each.

2. The reflector according to claim 1, wherein the each transparent layer consist of a low-refractive transparent sheet of thickness $\lambda/4$ and a high refractive transparent sheet of thickness $\lambda/4$.

3. The reflector according to claim 2, wherein the low-refractive transparent sheet of thickness $\lambda/4$ contains or consists of SiO$_2$ or MgF$_2$ and the high-refractive sheet of thickness $\lambda/4$ contains or consists of titanium oxide, Ti, Pr oxide or tantalum oxide.

* * * * *